United States Patent [19]

Edwards

[11] Patent Number: 5,457,370

[45] Date of Patent: Oct. 10, 1995

[54] MOTION CONTROL SYSTEM FOR CINEMATOGRAPHY

[75] Inventor: John R. Edwards, Cryodon, Australia

[73] Assignee: Digital Arts Film and Television Pty Ltd, Australia

[21] Appl. No.: 977,435

[22] PCT Filed: Aug. 8, 1991

[86] PCT No.: PCT/AU91/00349

§ 371 Date: Feb. 8, 1993

§ 102(e) Date: Feb. 8, 1993

[87] PCT Pub. No.: WO92/02871

PCT Pub. Date: Feb. 20, 1992

[51] Int. Cl.[6] .................................................... G05B 19/10
[52] U.S. Cl. .......................... 318/571; 318/572; 318/573; 364/169; 364/474.11
[58] Field of Search .................................... 318/560–646; 364/474.02, 494.11, 474.28, 169, 167, 192; 360/14.1; 901/3, 5, 7, 9, 12, 13, 15, 17, 20

[56]  References Cited

U.S. PATENT DOCUMENTS

| | | | |
|---|---|---|---|
| 4,178,632 | 12/1979 | Anthony | 318/568 |
| 4,396,976 | 8/1983 | Hyatt | 364/167 |
| 4,403,281 | 9/1983 | Holme et al. | 364/167 |
| 4,432,063 | 2/1984 | Resnick | 364/192 |
| 4,453,221 | 6/1984 | Davis et al. | 318/568 |
| 4,506,335 | 3/1985 | Magnuson | 364/169 |
| 4,531,182 | 7/1985 | Hyatt | 364/131 |
| 4,550,383 | 10/1985 | Sugimoto | 364/169 |
| 4,937,685 | 6/1990 | Barker et al. | 360/14.1 |
| 4,943,866 | 7/1990 | Barker et al. | 358/335 |
| 4,949,193 | 8/1990 | Kiesel | 360/14.1 |
| 5,025,385 | 6/1991 | Froyd | 364/474.11 |

FOREIGN PATENT DOCUMENTS

| | | |
|---|---|---|
| 227304 | 7/1987 | European Pat. Off. . |
| 406784 | 1/1991 | European Pat. Off. . |
| 1453941 | 10/1976 | United Kingdom . |

Primary Examiner—Paul Ip

[57]  ABSTRACT

A computerised motion control apparatus for controlling a plurality of degrees of freedom of the positioning and orientation of a camera. The apparatus including a dolly (71) positionable by drive means along an extensible track arrangement (72), having a camera (73) mounted thereto and provided with motors to orientate the camera (73) by varying its pan (76), tilt (75), and roll (74). An operator interface device (15) is used to define position and velocity characteristics of the desired motion of each of the camera's axes of motion and a motor driver module (69) calculates a parametric cubic polynomial representation of the desired motion curve. The calculated coefficients of the motion curve parametric cubic polynomial representation are easily stored and used to regenerate the values of the curve for the purposes of display and providing motion curve values for each axis of motion of the camera. These calculations can be performed upon command and in real-time. Motion curve characteristics may be modified by way of redefining the position and velocity parameters and the values generated by a curve generator (50) may be digitally processed by a signal processing module (57). A variety of signal processing functions may be performed upon the motion curve values generated, including summation, filtering and multiplication. Digital values representative of random, periodic and aperiodic signals may be combined with each of the motion curves generated. Additionally, values of camera characteristics such as focus, film pull-down rates, shutter speed, etc. are recorded for reproduction in synchronism with the replay of the camera motion. The provision of a camera motion control apparatus having the described facilities, enables accurate repeatability of camera motion and scene recording for digital image integration to real-life recordings, multiple time scale motion and film recording techniques for special effects.

11 Claims, 10 Drawing Sheets

MOTION CONTROL SYSTEM FOR CINEMATOGRAPHY

This invention relates to automated positioning and orientation of film and video cameras, related film making equipment and a system of control thereof.

BACKGROUND

Film making and in particular camera movement has heretofore been a skilful but imprecise art. Particular types of film making techniques require particular regard be devoted to highly accurate motion control of the image recording camera with the added necessity for the motion to be repeated many times to an equivalent degree of accuracy.

These types of motion requirements are determined by aesthetic and technically practical reasons. In particular the increasing use of digital graphics to enhance and enliven real world film images requires particular regard be devoted to highly accurate motion control of the image recording camera. To enable the digitally created images to appear to interact with the recorded real world film and video image, it is necessary that (a) the digital image is in perspective with the surrounding image;

(b) the digital image has the same colour, hue and lighting as that in the surrounding image; and (c) the digital image has a 3-dimensional shape which orientates itself according to the perspective provided by the image recording camera's position.

Only with highly accurate and repeatable camera motion can real world image recording be achieved to the accuracy required, and further by recording camera motion characteristics at the time, information necessary for constructing the digital graphics be achieved such that the real and digital images seemlessly interact.

Highly accurate and repeatable control of camera movement is also required for those situations where only a remotely controlled camera can be placed.

Therefore motion control is an electronic and mechanical technique that allows the physical motions of a camera and/or other objects in a scene to be recorded or preprogrammed with sufficient accuracy to make repetitions of those motions that exactly match each other and that then allow integration of digital graphics into the images recorded. It is a further desirable aspect of motion control that the control provided be as realistic as possible and that since the camera is under machine control the artistic demands that can only be achieved by real time motion are available to the camera operator.

As an example of real-time motion recording techniques, actors can be made to look like they are interacting with miniatures which are actually composited into the real-time scene at a later time. A camera used to record a real-time scene must be able to pan, tilt, track, crane, etc, freely as they would ordinarily do so but done in such a way that allows their motion to be plotted in an effects studio to create a basis for a digital motion file of the real-time scene and which in turn is used to create corresponding and interactive miniature model movement. By re-recording the scene without actors with miniatures or digitally animated characters created and viewed from the exact camera positions of the real-time recording the finished view seemlessly brings together the two disparate objects. This has heretofore been a cumbersome and time consuming process having inaccuracies caused by poor control equipment and techniques which ultimately degrade the quality of the result.

In addition to the above, camera motion especially that which is required to be preprogrammed cannot, even with the existing technology of motion control be provided with movement characteristics which mimic the effects of controlled vibration and damped oscillations as are experienced by real-life cameras under human control. Some special effects require fine camera movement during larger camera manipulation. This is especially so since this characteristic of camera manipulation cannot be accurately repeated even by highly skilled human operators but which is often required for the purposes of creating special effects.

As well as the above, much contemporary motion control filming is done using stop-motion techniques which comprise the filming of special effects, frame by frame. Between frame exposures, the subject is moved in a controlled fashion while generally the background scene is kept stationary. Only a stationary background can provide a suitable reference for the moving object, otherwise, moving the camera and thus the background along with the object requires a high degree of co-ordination not normally available in the studio and particularly not in the field.

Old film recording methods to enable real-time and stop-motion techniques of film recording to matte with computer generated graphical objects and scenes include the use of "witness points" (optical targets) to serve as reference marks for use by the post production operators. "Witness points" are tracked by special software designed to simulate the imaginary camera motion and then compensate for the optical distortion characteristics of particular lenses being used during real-time recording so that computer graphics generators or illustrators can have references to work with when creating the animation that is required for the matte of real-life with animated characters.

This method evolved because of the present inability of camera and motion control equipment to provide the required information to the post-production and computer graphics area.

Ideally, the moving camera should record the background scene in the same relative position on the frame with every repetition of the camera motion. This cannot be achieved if camera motion is not accurately repeatable nor can the time scale of the scene be adjusted.

Computer controlled camera motion devices would assist cinematographers because it allows controlled and repeatable motion of the camera and coincident control of the film pull down rate to adjust the time scale of the scene.

Highly accurate camera motion control is equally important for real-time special effects recording where the cinematographer invariably wishes to exercise a greater degree of artistic and aesthetic control of the motion at the time of recording and thereafter allow greater flexibility at the post-production stage.

The object of achieving highly accurate camera motion control has been the subject of some endeavour and generally has had little commercial success due mainly to impractical arrangements and configurations of equipment.

Typically large, rigid, bulky and heavy camera platforms have been used because high inertial mass platforms provide stability for the camera. It has been found however that these devices are difficult to accelerate and decelerate to the required speeds of real-time action and very difficult to relocate out of their normally studio-bound domain.

This invention however achieves this objective by providing a motion control platform that uses low mass components which have low inertia. What results is a motion controlled platform to provide motion for a camera which itself is controlled to orientate and which achieve high articulation speeds but which is also easily transportable and reconfigured.

With a configuration of this type the camera platform may with the aid of suitably located tracks provide studio, and location filming at any desired orientation of the camera platform. For example the camera may be made to climb walls or operate suspended from a ceiling while moving along the tracks.

It has been a further problem of prior motion control devices that although assisted by the programmed control of a computer, the operation of all such prior art arrangements is hampered by the serial nature of the processing power of the computer. This means that although there are a myriad of camera and platform motion devices to be controlled, for example forward motion of the camera platform during a tilting and panning motion of the camera itself, the computer may only comfortably control one or two of those motions at a time.

Attempts to alleviate this problem include using faster computers and more time-efficient code so as to sequence these control events in such a manner that the tasks are seemingly concurrent. The limits to these arrangements have been reached and thereby impinge upon the ability of the system to support the creative and technical needs of cinematographers.

Prior attempts to provide motion control equipment have also disregarded the all important post-production requirements which ideally require certain data capture at the time of image recording. This data comprises all the facets of the motion and camera orientation control sequence and other characteristics such as focus settings, lens zoom settings, light levels, film frame pull down rates, camera heights, frame synchronisation signals with special emphasis on pan, roll, tilt and position of the camera along its tracks. This type of data is particularly important to the computer graphics creator at graphic design, matte and post production stages.

The computer graphics creator needs these details to ensure that the graphical computer generated objects created for the scene are proportioned and maintain the appropriate proportion as the film/video image, especially the background, changes. Further, the data which forms the object database needs then to have texture, reflectance, transparency and colour added to its surfaces. To these details are added further creative visual factors such as lighting, shading and visual mood elements which may include lighting effects that cannot exist in the real world. These effects are then stored as a scene file that will control the look of the final film scene.

Therefore it is a desirable feature of this invention that the system provides a means to programme, modify and repeat the control and motion of a camera while being able to vary scene characteristics such as object placement, lighting, effects enhancement, scaling changes of models and background motion.

It is also desirable that the camera motion provided is smooth and accurately repeatable.

It is further desirable that the system provided is transportable and easily reconfigured and importantly that features associated with the system can be enhanced and increased in a modular way.

It is yet a further feature of the system provided, that it allows operator control of the camera motion to the extent that a variety of motions can be superimposed over the preprogrammed motion.

In order that the invention may be clearly understood and readily carried into effect, an embodiment will now be described by way of example only, with reference to the accompanying representations, wherein:

DETAILED DESCRIPTION OF THE DRAWINGS

Figure 1:
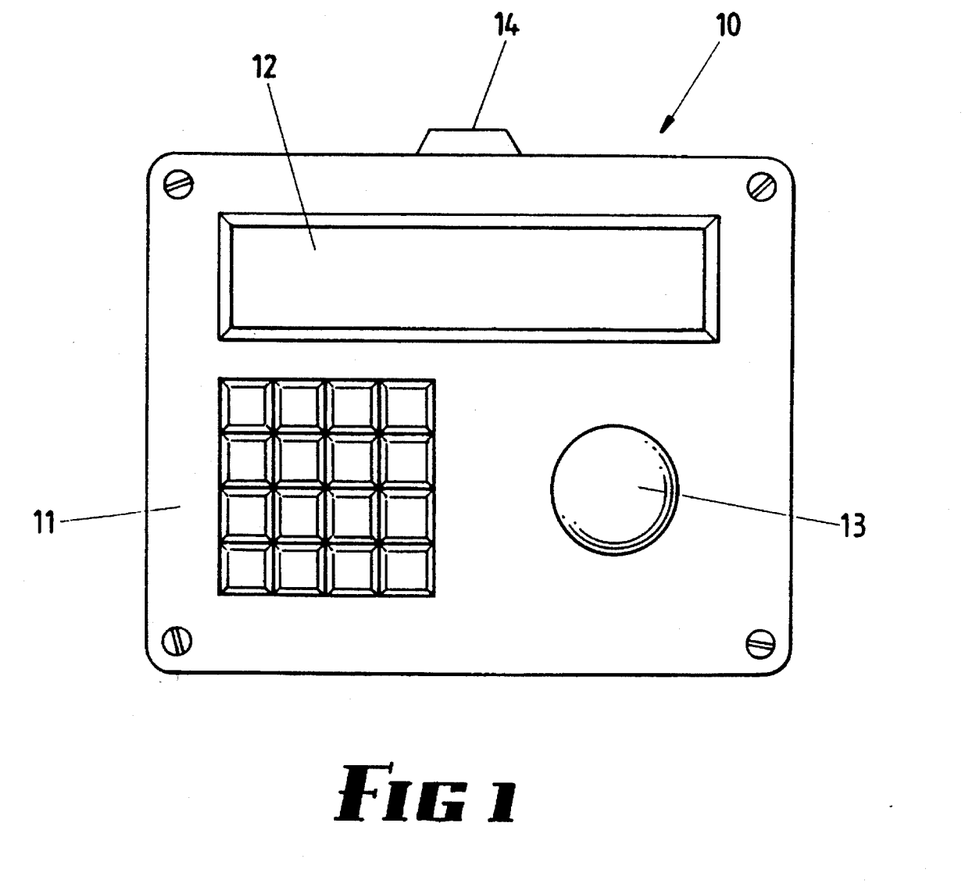
FIG. 1 depicts a remote control console.

FIG. 1 shows an embodiment of an interactive, hand-held control device 10 which provides a keyboard 11, alphanumeric display 12 and a trackball 13 for entering, reviewing, editing and controlling instructions to the motion control devices of the system and a connector 14 for placing in and placing out relevant data to the control device.

The keyboard 11 is merely pictorial as the purpose and notation of the keys may be allocated as desired to signify a variety of characters or specific motions of the devices to be controlled. In addition to the camera characteristics that may be controlled such as keyframes, exposure periods, shutter speeds, film speeds, etc., a variety of menus are available and selected via the keyboard 11, each key having a significance according to the currently displayed menu.

The display 12 in this embodiment comprises a 160 character LCD arranged as four rows of 40 characters each.

The interface circuits and data collection functions of this control device are provided by a computer device and associated components enclosed within the device casing as depicted, in one embodiment the computer device is a transputer.

Figure 2:
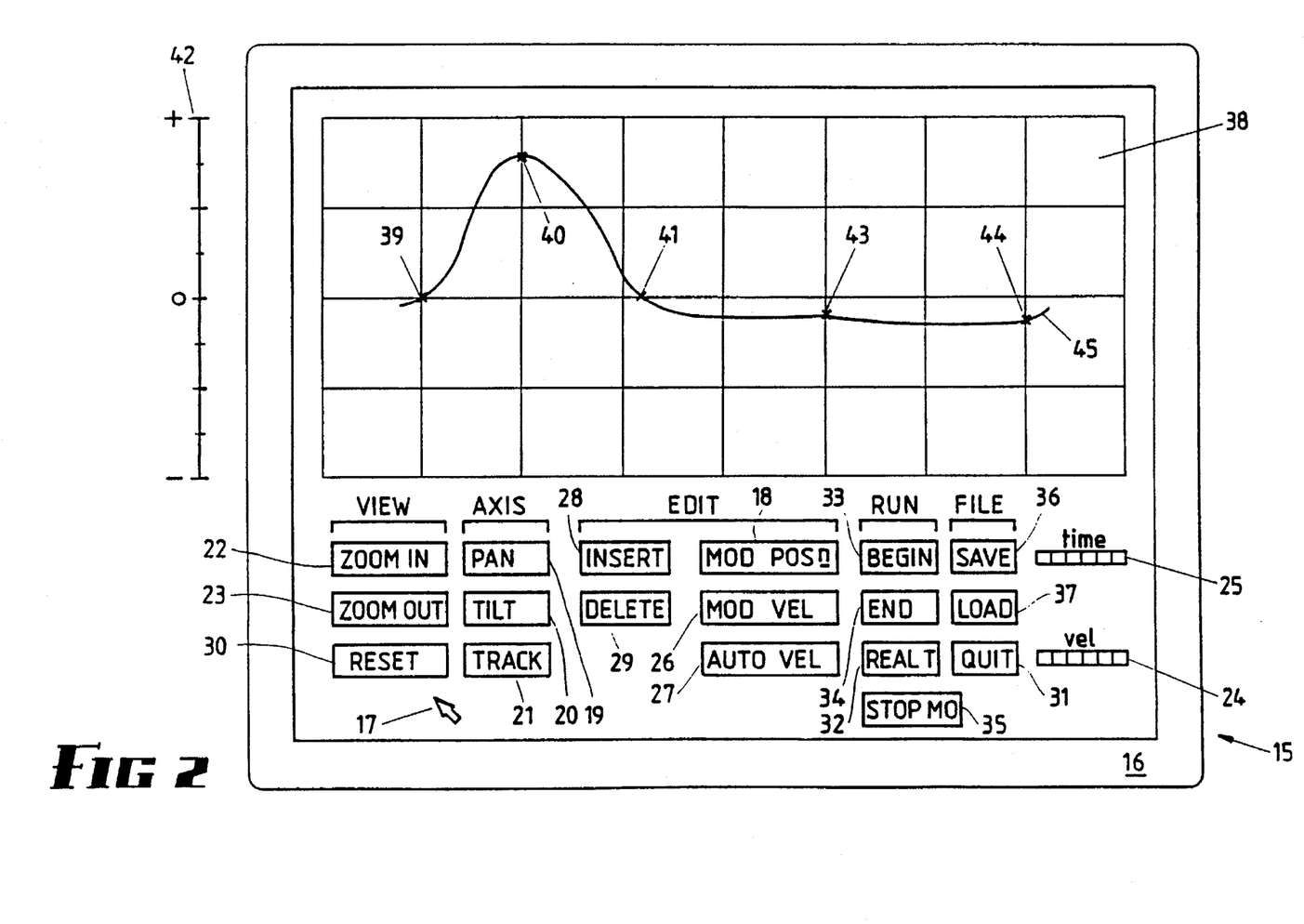
FIG. 2 depicts a graphical user interface to provide instructions to the motion control apparatus.

FIG. 2 depicts a further embodiment of a motion control description input module 15 which is configured as a mouse driven graphical user interface displayed on a computer screen 16. The user activates the function of each of the 'buttons' 10–20 by manipulating the pointer symbol 17 with the mouse (not shown) and clicks with the mouse provided over the desired 'button' to signify actuation of that 'button'

A camera to be controlled may have orientation such as pan and tilt or translational motion along a track already preset prior to use of the camera such that when the orientation and motion are replayed the camera can record the scene. The procedure of presetting these operations is achieved, using the interface of this embodiment by defining, for each of the movement axes associated with pan, tilt or translation a minimum of two positions and the desired velocity at those positions. Those positions and a corresponding velocity of motion at those positions having been preset, are used to calculate a curve which best fits those points which are then stored as a formula to allow at the appropriate time to recalculate the path and thus use the points generated to control the apparatus.

For example, the position along a fixed track can be defined, as can the velocity that the camera should be travelling at when it is at that position by actuating the modify button 18. The interface then enters an information display and acceptance mode, awaiting the input of one of either the pan 19, tilt 20, track 21, zoom-in 22 or zoom-out 23 buttons to be actuated.

For the purposes of our example, the track motion will be modified, thus the display depicted on the graphical user interface display 38 is quite complicated. Point 39 is indicative of a position at the origin, (home) position, of the camera along the track, this is indicated by the scale 42 which is shown beside the display area 38 for the purposes of clarity only, but, which in use, is available in a graduated form, on the screen 16 and which may be provided in a scale representative of the actual length of the track used by the motion control apparatus.

The velocity of the camera at point 39 is displayed at the velocity display 24 and for the purposes of the example, is 2 meters per second as measured linearly along the fixed track path. A desired velocity may be inserted for each position by typing the value into the velocity region 24 while the pointer 17 is located over the respective positions. Position 40 is a positive distance (unspecified on the scale 42), and for the purpose of the example is, 5 meters from the origin, and has an associated velocity of 0.2 meters per second.

Position 42 is back at the origin and has an associated velocity of 0.2 meters per second.

Likewise the positions 43 and 44 have corresponding positions with respect to the origin and associated desired velocities. The horizontal axis is not provided with a scale but each graduation may represent a time interval, the value of which is dependant on the total period of the motion sequence required. The time for the total period may be adjusted by typing the desired value into the time region 25 resulting in the automatic scaling of the display graduations of display 38 and a readjustment if necessary of the movement characteristics defined by the motion curve 45 previously defined.

Having defined the desired positions for movement of the camera along the fixed track, there is also the need to define the pan and tilt of the camera and also its zoom characteristics or any other of the myriad of controllable features of a camera and its motion, for example, the film pull-down rate. In a gantry apparatus arrangement which provides six degrees of movement as it traverses the prefixed track movement the number of axes to be programmed is correspondingly increased.

In a similar manner as described previously, these characteristics and each degree of movement can be displayed and modified as required. For the case of pan and tilt the vertical axis scale may represent angles about an origin, for pan the limits being +/−180° with the ability to command a movement from +180° to −179° to represent a full rotation of the camera, for tilt the limits may for example be +/−135°. The horizontal axis as previously described would represent time in each case.

The zoom setting of the graphical user interface can be adjusted by actuating the zoom-in button 22 and zoom-out button 23.

The actual adjustment of any position (meters along the track, degrees around an axis or linear zoom movement) is easily achieved by clicking on the positional 'X' symbol and dragging it to another position.

The graphical user interface is designed to allow each of these movement parameters to be modified, the modify position button 18 provides the required mode, while likewise the modify velocity button 26 provides the required mode of operation, otherwise, the graphical user interface is capable of providing automatic velocity parameters which fall within accepted movement limits and thus may be implemented by 'clicking' on the automatic velocity button 27.

Additionally, extra positions/velocity points 'X' may be inserted by clicking on the insert button 28 and then clicking within the graphical display zone 38. Correspondingly a position 'X' may be deleted in a like manner by using the delete button 29.

Overriding the creative functions described previously, a motion curve 45 for each of the motions pan, tilt, track or zoom may be deleted and the process begun again by actuating the reset button 30.

Quit button 31 ceases the curve creation mode and readies the motion control apparatus for a real-time replay mode which is initiated by clicking on the 'real t' button (32).

A fresh motion curve or curves 45 can be begun by clicking on the begin button 33 while the total process can be halted by clicking on the end button 34.

A stop motion sequence can be preprogrammed by clicking on the stop-mo button 35. In this mode each increment of time is totally under the control of the operator. So that even though the motion curves are defined, each increment of time is controllable by the operator so that recording can be sequenced with the manual changes that are being made to the scene that the camera is recording.

The save 36 and load 37 buttons are used to save the relevant details of the motion curves created, and reload them as required.

All the motion curves created with the assistance of the graphical user interface define a Z-dimensional path for the focus point of the camera.

Only discrete positions and velocities for each of the axes of motion in one dimension have been created and it is necessary to convert these parameters into a continuous representation of the actual curves of motion which will then be further translated into commands to control a motor adapted to drive an axis of motion of the camera, whether that motor be associated with the pan, tilt, track, the zoom setting or other parameter of the camera's orientation motion or filming characteristic.

So that the motion control apparatus can replay the desired motion curve it is advantageous for the curves to be capable of being stored, replayed, changed and restored for playing again. Prior methods of achieving this aim have included the use of large digital information storage devices in which digital representations of each individual point of the analogue curves have been encoded and stored and when required for replay either used in their digital form or restored to an analogue form for driving the required motors. This approach requires a large amount of preprocessing, time to load and reload and use of a large amount of digital data memory storage.

It is not in the interests of the creative nature of film making for any of the delays and the inflexible nature of this process to exist. The existence of time delays and complexity in the past, has made the use of motion control devices unpopular and consequently only used when special effects are necessary.

A mathematical process is used to derive the basic curve descriptions from the basic parameters defined by the curve generation process previously described. A means of defining a continuous curve upon which the pre-defined positions and their associated slopes (velocity parameters) lie is embodied into the motion control apparatus. Having the curve description in this format simplifies dynamic interaction of the operator with the motion control apparatus.

A 3-dimensional curve can be treated in a number of ways and given two or more 3-dimensional positions, a parametric representation can substantially reduce the difficulties commonly encountered. A parametric representation uses tangent vectors at each defined point to create the overall curve shape where the tangent vectors can be equated to the velocity requirements of the pre-defined curve at each defined position. Using this type of representation a parametric curve is one for which x, y and z can be expressed as a cubic polynomial of a parameter e.g. t=time.

Its general form is:

$$n(t)=a_n \cdot t^3 + b_n \cdot t^2 + c_n \cdot t + d_n$$

(for n=x, y or z)

(for $0 \leq t \leq 1$)

By deriving the coefficients a, b, c and d a continuous 3-dimensional curve located anywhere within the defined coordinate space can be instantly generated for every t. This approach has the advantage that a curve (in particular a motion curve) can generally always be matched at its ends to another similarly derived curve and because their end point tangent vectors are equal. This feature of parametric representations is most important when stringing together large numbers of curve segments which are created to control motion over a long period of time, indeed a parametric cubic, with its four coefficients, is the lowest order parametric curve that can be forced to match position and tangent vectors at their end point by appropriate selection of coefficients.

This approach also has the added and very useful advantage that only four coefficients are required to calculate any position on the curve for any particular variable (t), since this is extremely economical to store in comparison with prior means.

By applying the coefficients to the third-order representation and its derivatives the relevant parameters of a curve may be instantaneously generated in real time. This type of curve value generation is referred to as spline generation in this embodiment.

The general form presented here is but one way to define a cubic parametric curve; a number of variants of the approach described include; the Hermite (defines the positions and tangents at the curve's end points, as just described), the Bezier (which defines the positions of the curve's end points and uses two other points, generally not on the curve, to define indirectly the tangents at the curve's end points), and the B-spline (which approximates the end points rather than matching them, thus allowing both first and second derivatives to be continuous at the segments end points).

For the requirements of this invention and for reasons previously described a transputer device has been found suitable for implementing the computational and drive elements of a motion control apparatus.

In accord with transputer programming protocol and with a further degree of customisation of the language making the commands more suitable for motion control, a specific format of commands has been used. For example, when a motor drive is to be commanded to effect a specific motion the command translated from the preprogrammed position velocity profile is of the form:

TOKEN, PARAMETER=byte, bytes.

A TOKEN is a command having a destination address and command bits in a byte of data for example, motor drive for axis A may be commanded to ROTATE or MOVE, while other TOKEN commands may include CONTROL POINT, INSERT DELETE, CALCULATE, etc as required.

A PARAMETER may contain one or more digital representations of floating point values, which may represent a position value, a sign value to indicate direction of the rotation or alternatively real values, and also contains other strings of digital data which are handled as the need of the token requires.

The transputer is capable of receiving and producing TOKEN, PARAMETER doublets. The rate of processing TOKEN, PARAMETER doublets will depend largely upon the mechanical and electrical characteristics of the drive means. There exists some degree of latitude, in the motion control environment of cinematography, thus the abovementioned rate can be so arranged to match any of the known requirements.

In addition to the generation of motion description curves and their associated drive commands, each command is checked for its validity in respect of Maximum Velocities, Maximum Acceleration, Position Limits and the verification of actual position with commanded position.

It is a distinctive feature of the approach described herein that all the calculations and commands to control motion can be generated in real-time.

Figure 3:
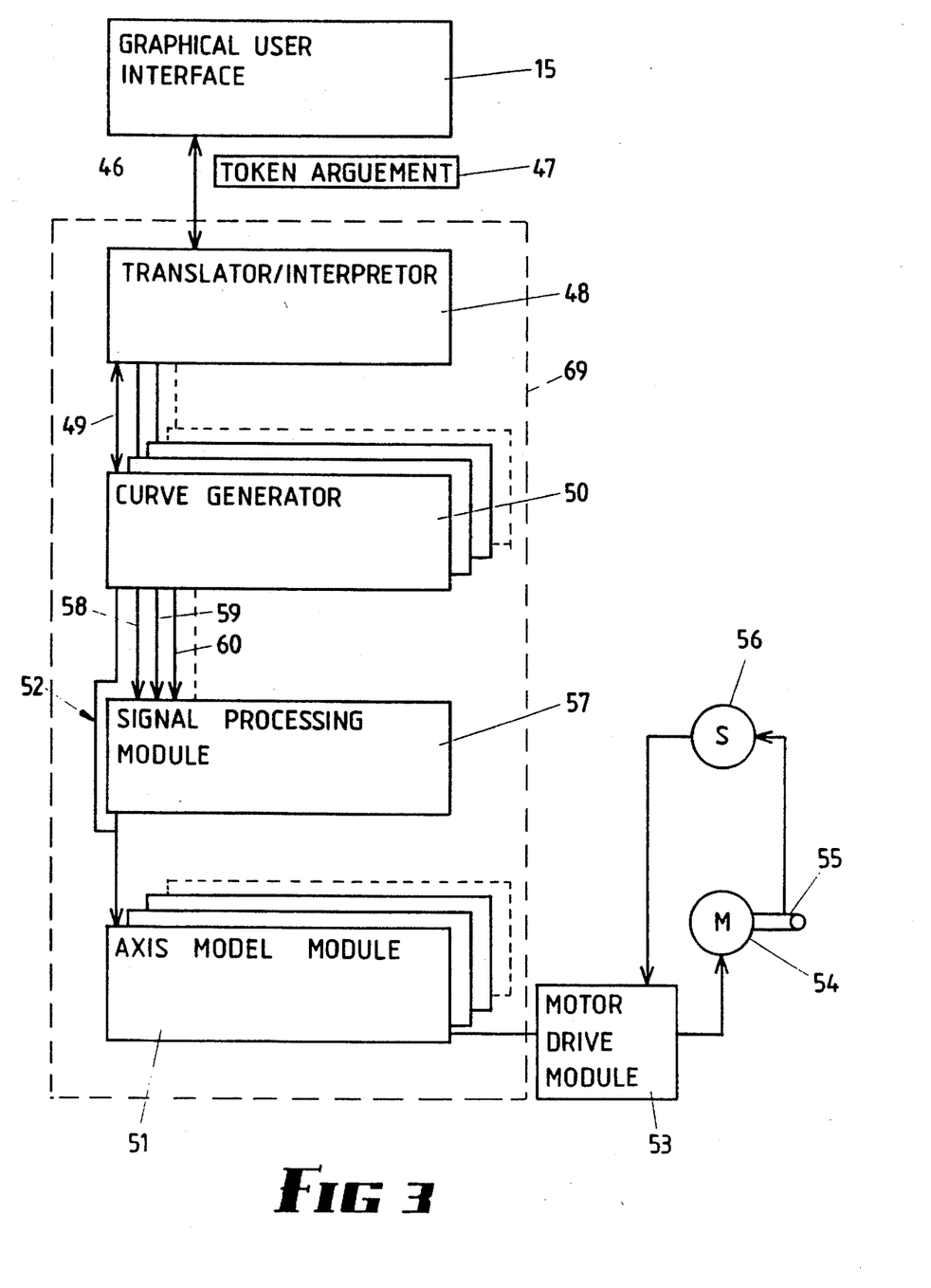
FIG. 3 depicts block diagram of the motion control apparatus.

FIG. 3 depicts a schematic diagram of the functional elements described previously. The graphical user interface 15 is the source of the pre-defined positional reference points which are supplied to the motor driver module 69, in the form of token, parameter doublet 47 via bidirectional data bus 46.

The translator/interpreter 48 receives, for example, a CALCULATE token accompanied by an argument comprising two or more position velocity triplets (i.e. position, velocity, time). From this information the translator/interpreter 48 which is preferably a transputer device calculates the four coefficients that will describe completely any other position and velocity of the motion required for the axis of motion to which the triplets relate for each time value it is given.

These coefficients are stored in the translator/interpreter device 48 for use as required, whether that be for the calculation of the points to provide a display of the motion curve 45 (refer FIG. 2) or on the display screen 24, or for the generation of motion control commands for the drive means of the respective motors for respective axes of motion.

The curve generator 50 provides the calculation facility by calculating instantaneously for each time value supplied by an internal clock. The internal clock may itself be variable so as to allow for variable replay speeds. All that is required for the generation of a data stream output from the curve generator 50 is the supply by the translator/interpreter 48 via data bus 49, of the four coefficients of the store motion curve per axis to be controlled. There exists one curve generator module 50 per axis, which of course in a computer device may comprise a time shared calculation means which can also provide the calculation ability to perform this task.

In the first instance the generation of a data stream containing the points to be displayed is initiated upon the graphical user interface being commanded by the user to display either of the options available on the graphical user interface 15 such as pan, tilt, track or zoom motion curves.

In this instance the translator/interpreter 48 issues as many (token, parameter) doublets as are required to generate the data stream for display purposes. This could be as little as one doublet since it will contain a CALCULATE TOKEN which is followed by an ARGUMENT containing the four coefficients required to generate a point on the curve and a timing interval to indicate the clock rate to be used as well as a start to finish period.

Alternatively, the four coefficients plus a time value could be issued. In other instances there may be additional doublets having other types of command tokens as well as new CALCULATE doublets that result from changes being made on the fly.

Immediately any of the reference points are modified, a new position is created, an existing position deleted or any of the velocities changed the curve is accordingly modified by the processes described before. The generation of the new motion curve produces a new data stream containing the new points to be displayed. Indeed this process of modification can be implemented during a replayed motion of the camera to add to the dynamic nature of the apparatus.

Each new spline generated in this manner can be stored in the translator/interpreter 48, in the form of a set of coefficients, splines having common reference points at their joining ends will also have as previously discussed, matched position and tangent vectors (velocity characteristics). Therefore, compound splines or extended motion curves are easily created. Of course, these compound curves can also be displayed, by adjusting the scale of the horizontal axis on the display 24.

For each set of motion curve coefficients stored, the motion control apparatus can be commanded by the graphical user interface 15 to replay the motion curve defined by those coefficients. In this embodiment, clicking on the REAL T button 32 of the interface screen of FIG. 2, will display a vertical bar moving transverse to the time scale, indicating the transition of the motion curve 45.

In this instance the curve generator 50 generates a data stream comprising a string of digital representations of the position of the camera in relation to each of the axes being controlled. The device which converts the positional data output of the curve generator 50 is shown as an axis model module 51 and is communicated to via data path 52. There exists one axis model module 51 per axis of motion.

The type of motion required from each axis will be known, for example a pan may require a single motor to drive a toothed gear train located on a large diameter cog. Therefore, added or subtracted to each digital representation is a correction factor unique to the physical arrangement of the motor drive means. This correction factor is determined once the apparatus is operational and not changed until the set up is modified or until undue wear and tear is detected. The apparatus may also learn the characteristics of the mechanical set up and calculate its own coefficients.

Each set of motion curve coefficients represents the desired motion of a particular axis of motion. Therefore, when two or more motion curves of two or more axes are generated each motion occurs independently, however, the resultant camera motion is a 3-dimensional trace of the combination of the individual motion curves.

Not shown but implicit in the description is the use of a closed circuit video monitor which allows the operator of the camera control apparatus to view a similar scene to that of the camera that is being manipulated by the control apparatus. The individual motion curves can be run as well as a combined run, so that an operator very quickly develops a feel for the curve setting procedure described previously.

Since each digital representation is tailored to the mechanics of the axis driver the process of converting those digital values into motor drive signals (pulses, current, voltage or other like signals) is a task well known in the art. It is of advantage that each axis has a separate motion driver means to receive the real time motion control signal that the digital representation has become. In this embodiment the axis model module 51 embodies the means for applying the correction factor and converting the digital representations into motor drive signals which are applied to their respective motor drive module 53, to actuate the camera about its respective axis by driving the motor 54 to turn the appropriate shaft 55 to which the camera is mechanically attached.

Methods and means for relating the desired motion of objects provided by many types of motor with respect to their actual motion abound. In this embodiment extensive use is made of shaft encoders 56 to detect the actual motion of the driven shafts, their output signals being fed back into the relevant motor drive circuit 53 which uses the feedback signal to enable the required axis model to be replicated, so that actual motion can be adjusted so as to maintain the camera as close to the desired motion as possible. This arrangement can be used in open or closed loop configuration.

In this embodiment it has been found particularly advantageous to incorporate to the motion control apparatus a further element which provides additional forms of control over the motion of the camera. Real-time motion sometimes includes random vibration which although random the first time, needs to be replicated over and over again is but one example of an unusual motion characteristic. Another, is the damped oscillations of the camera apparatus which when applied to a low inertia camera arrangement when the camera is stopped suddenly, replicate a camera having a higher inertia than that which it actually has.

Further the visual and physical effect of violent vibration as might be experienced if the camera is simulating earthquake conditions, may be required to be replicated many times over. Beyond the simulation possibilities that this additional control provides, the method of producing the added control feature opens up many and varied motion control options which can be supplemented by quite random and interactive effects created by the operator. This additional means of control opens up the control possibilities to the limits of the operator's imagination.

In this embodiment a signal processing module 57 is adapted to receive digital values via data bus 58, output by the curve generator 50. The signals to be combined and/or modified by the signal processing module 57 may comprise the signal received via data bus 58 which is representative of the generated motion curve, while one or more other curves via data buses 59 and 60 may then be processed concurrently with the motion curve. Alternatively, these additional motion control signals may be generated by way of coefficient conversion or other analogue or digital generation means (not shown) into a real-time digital representation of position and velocity for combination and/or modification by the signal processing module 57.

For example, a constant amplitude vibration effect can be created by generating a sinusoidal curve of a particular frequency and amplitude, which when added to the motion curve of one particular axis will result in a vibration of the camera about that axis.

In this example, the signal processing module is merely a digital value adder, of particular note is that, in this embodiment the addition is merely a digital value summation of one digital value with another digital value. A number of techniques and well known means are available to provide this simple function having low component count and also low cost. Alternatively, floating point addition and multiplication circuits are well known and readily available making the constructional details of such a signal processing module of secondary importance to the principles involved.

In a further example, a random noise signal could be easily summed with any or all of the motion curve digital representation values to create quite random motions for various cinematographic reasons.

The signal processing module 57 of this invention may also be used to filter the motion curve digital representation values. Digital filters working in either the frequency or time domain are also well known and their effects and the means to implement them are equally well documented. Indeed, single chip digital signal processors are available with general and specific functional set ups. Software driven functions are readily available for the myriad of possible operations the single chip digital signal processors can perform.

It is also possible for a different version of the graphical user interface previously described to be used to generate signals for the eventual combination of those signals with particular curves generated by the curve generators 50. For example, mouse driven slider controls could be provided on screen and by manual manipulation of those controls via the screen tools, a sinusoidal curve may have its frequency and/or amplitude changed dynamically by the operator during the replay of a real-time motion.

Figure 4:
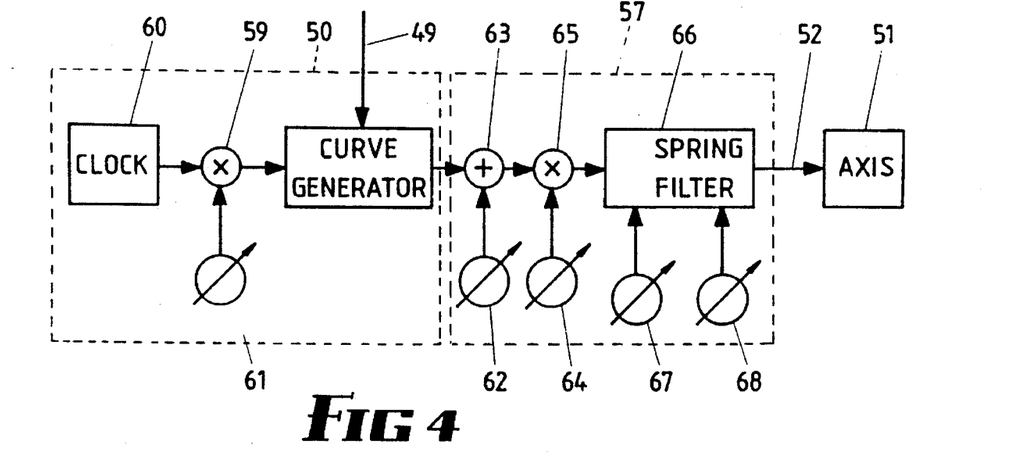
FIG. 4 depicts a schematic of the curve generator and signal processing module of the motion control apparatus.

Since the preprogrammed motion curve is being generated in real-time, additional signals can be superimposed in real-time as well, providing an effect which can be used to increase the realism of camera movement or add effects not otherwise achievable. In this embodiment one example of a configuration of a signal processing module, is as depicted in FIG. 4. Camera motion indicative of the system having a different inertia than which it actually has, is provided by way of combining summing and multiplication elements in the way depicted.

In the embodiment the time scale of the motion curve can be adjusted by multiplying 59 the system clock 60 by a time scale factor 61. This modified clocking signal is received by the motion curve generator which provides at the required rate, the digital representations of the curve defined by the previously calculated coefficients for a particular motion curve of a respective axis.

A positional offset 62 can and may be easily applied by adding with adder 63 the output value from the curve generator 50 and the scaling factor 64 may also be multiplied by multiplier 65 to provide a value suitably prepared for inputting to a filter 66.

A low pass filter is depicted in FIG. 4 whose frequency cut off value can be adjusted 67 by way of a graphical user interface slider control as previously described. Likewise, the degree of damping 68 that the filter can impose upon the digital representative values receive can also be adjusted by a graphical means of the slider type. Output of the values to control motion to the axis motion module 51 is via data bus 52 as depicted in FIGS. 3 and 4.

Of course, each of the previously described characteristics such as timing scale, offset, secondary scale, cut off frequency and damping factor may be preset, automatically predetermined dependent on the type of axis motion being controlled or left for dynamic and interactive control by the operator.

Another function that may be provided by the signal processing module is division and other combinations as required or desired, so that the creativity of the operator can be used to determine acceptable motion control results.

The configuration depicted in FIG. 4 is but one configuration of a signal processing module and it is clear that a graphical user interface can be used to create a means which can easily adjust a programmable signal processing module.

Figure 5:
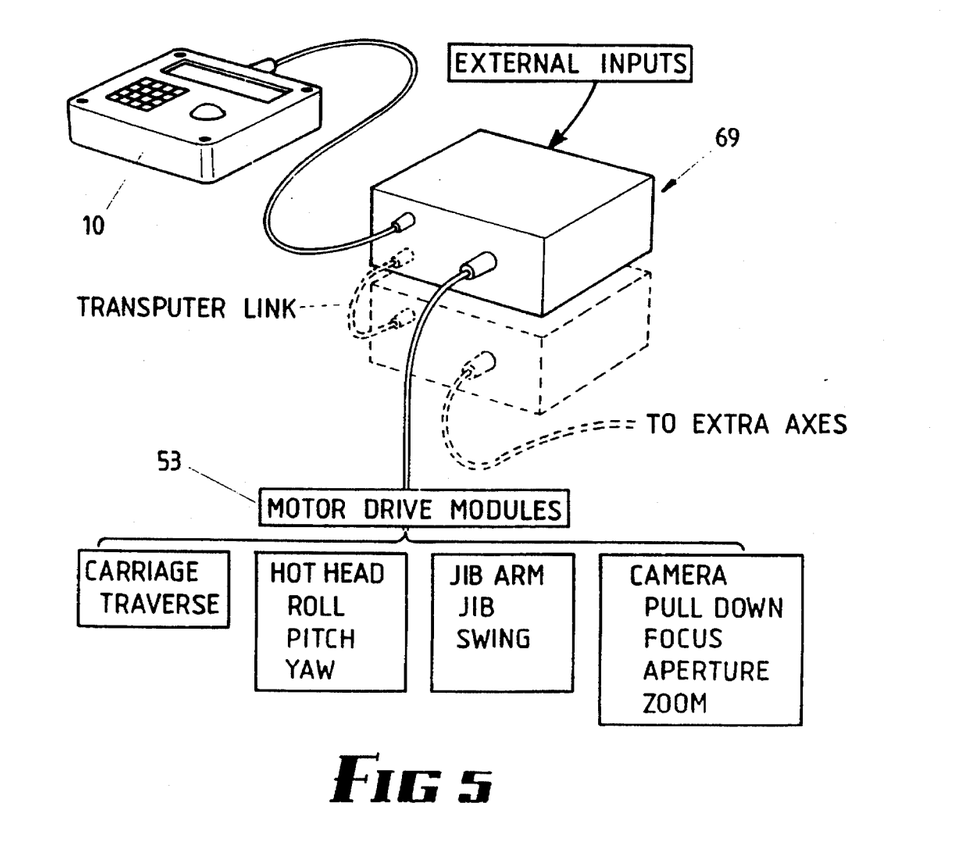
FIG. 5 depicts a schematic of the motion control apparatus.

FIG. 5 shows a configuration of devices comprising the remote control device 10 and a motor driver module 69. The motor driver module comprises electronic circuits and computer devices as previously described used to drive the motors associated with some of the axes of motion of the camera control system.

All axis driver modules which comprise a combination of elements such as the translator/interpreter 48, a curve generator 50, a signal processing module 57, axis model module 51 and a motor drive module 53 are identical, thus, each motor driver module could control any of the axis motors such as the camera pan, tilt or roll with appropriate driving commands. Additional motor driver modules, may also control the camera motion in a gantry configuration or additional camera features such as focus, shutter and film speed, etc.

The universal application of a driver module to the myriad of controlled elements of a motion control system, allow the interchangeability of defective modules and provide a common programming approach.

Some of the plurality of transputers in a system of this type may be dedicated to receiving for instance light meter readings. This information is directed to the programme resident in the transputer to control the functions under its control such as shutter speed. This arrangement also allows for this data to be simultaneously received at the remote control console for display and indeed processed in parallel with other pertinent information to provide if necessary overriding commands to the dedicated transputer for final control of its associated devices.

In fact the language developed to programme transputer units is written to allow the parallel aspects of control to occur simultaneously and virtually automatically, making software development much simpler than programming contemporary serial computers to co-ordinate the required control. It is a consequence of the methods and means of this invention that control of additional axes is achieved without compromising performance.

This distributed control, linked using standard communication and control 10 MB data links which are associated with the transputer unit in each motor drive modules 69 ensures co-ordinated parallel control of all the elements of the system.

Connection to the remote control console or graphical user interface is also via these standard communications means and provides for the back flow of data that allows the operator to interact with the motor driver module operation.

Each motor driver module provides control signals for stepper motors, DC servo chopper motors, brushless DC motors, AC servo motors or any kind of motor drive device.

Figure 6:
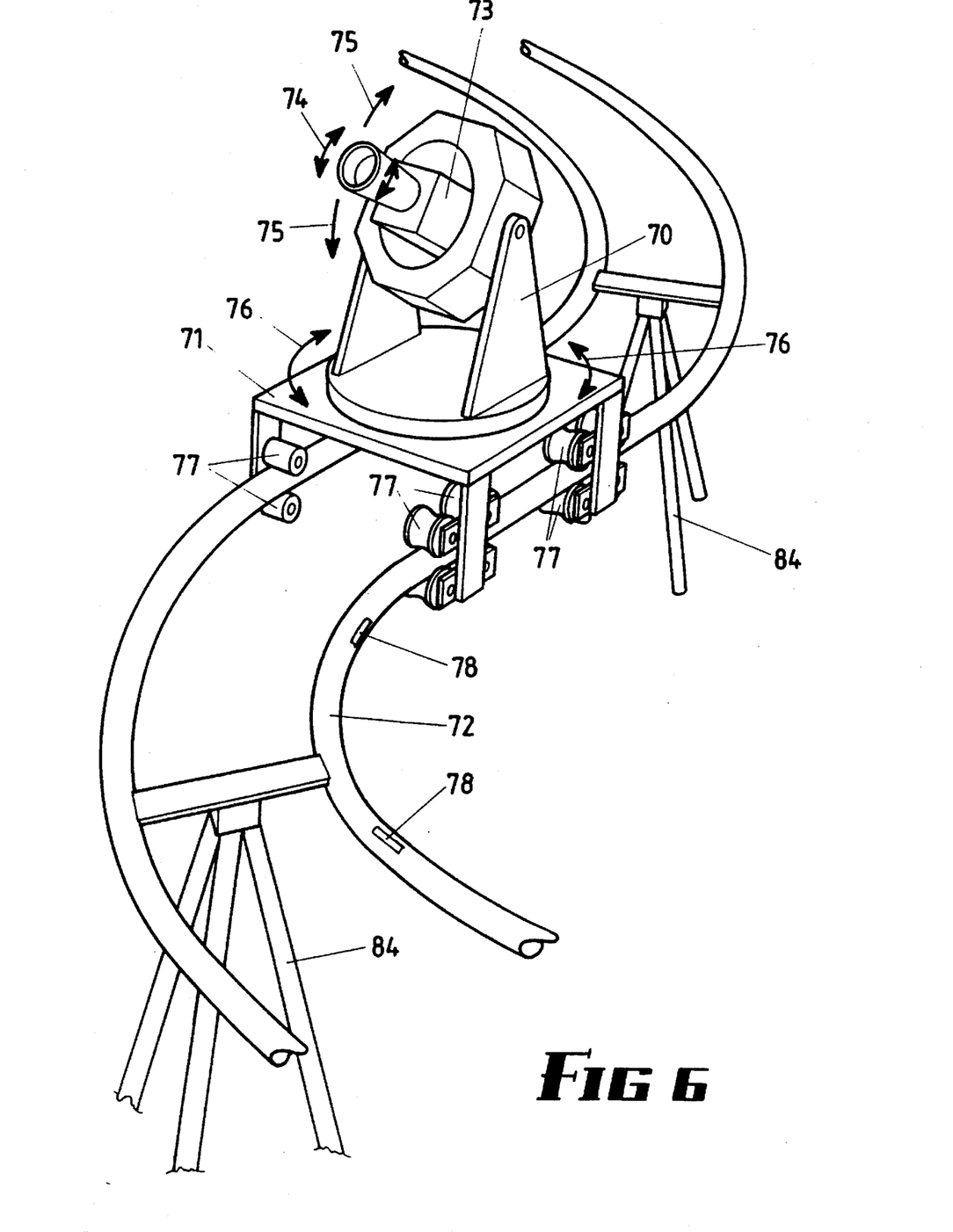
FIG. 6 depicts a dolly and camera control platform.

FIG. 6 shows a 3-axis head 70 located on a dolly/camera platform 71 which itself is shown on a track section 72.

A 3-axis head orientates the camera 73 in three axes (roll 74, tilt 75 and pan 76). Each axis is driven by a disc stepper motor in open-loop mode operating with electronic zero indexing. Drive energy is transferred by notched belt drives via graduated speed reduction wheels which by their nature reduce backlash and resonance which was evident with earlier gear-based systems.

FIG. 6 also shows the camera platform, also known as a dolly 71. In this depiction this element of the motion control apparatus is driven by a d.c. servo motor (not shown) which is coupled to the track via rubber friction rollers 77 located on the drive shaft of the motor or alternatively by a notched belt drive means from the motor shaft to the rollers and their own shafts. Alternatively, (not shown), the driving roller may be contained on a separate dolly inextensibly linked to the dolly platform 71. The rollers 77 are contoured to fit the shape of the track profile, which in this embodiment is of a circular cross-section.

Bar code markers 75 and 76 are accurately located along the track to provide reference length position indicators and an indication of the track type the dolly is located. These bar code markers are read by appropriate sensors (not shown) located on the underside of the dolly to automatically correct the drive signals and the motor drive circuits 53 own assessment of the dolly position.

Figure 7:
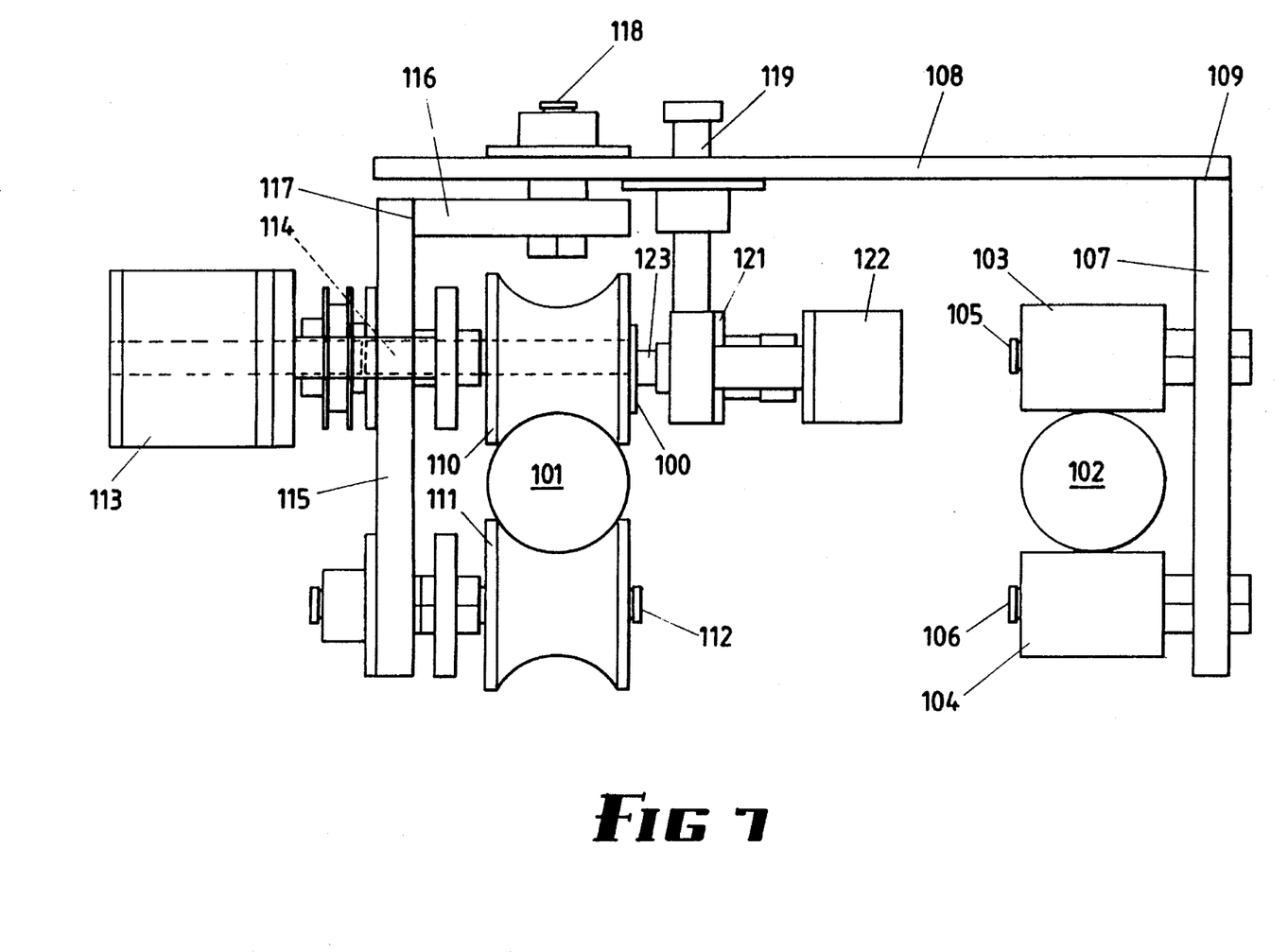
FIG. 7 depicts a schematic of the dolly drive and stabilisation rollers in end elevation.
Figure 8:
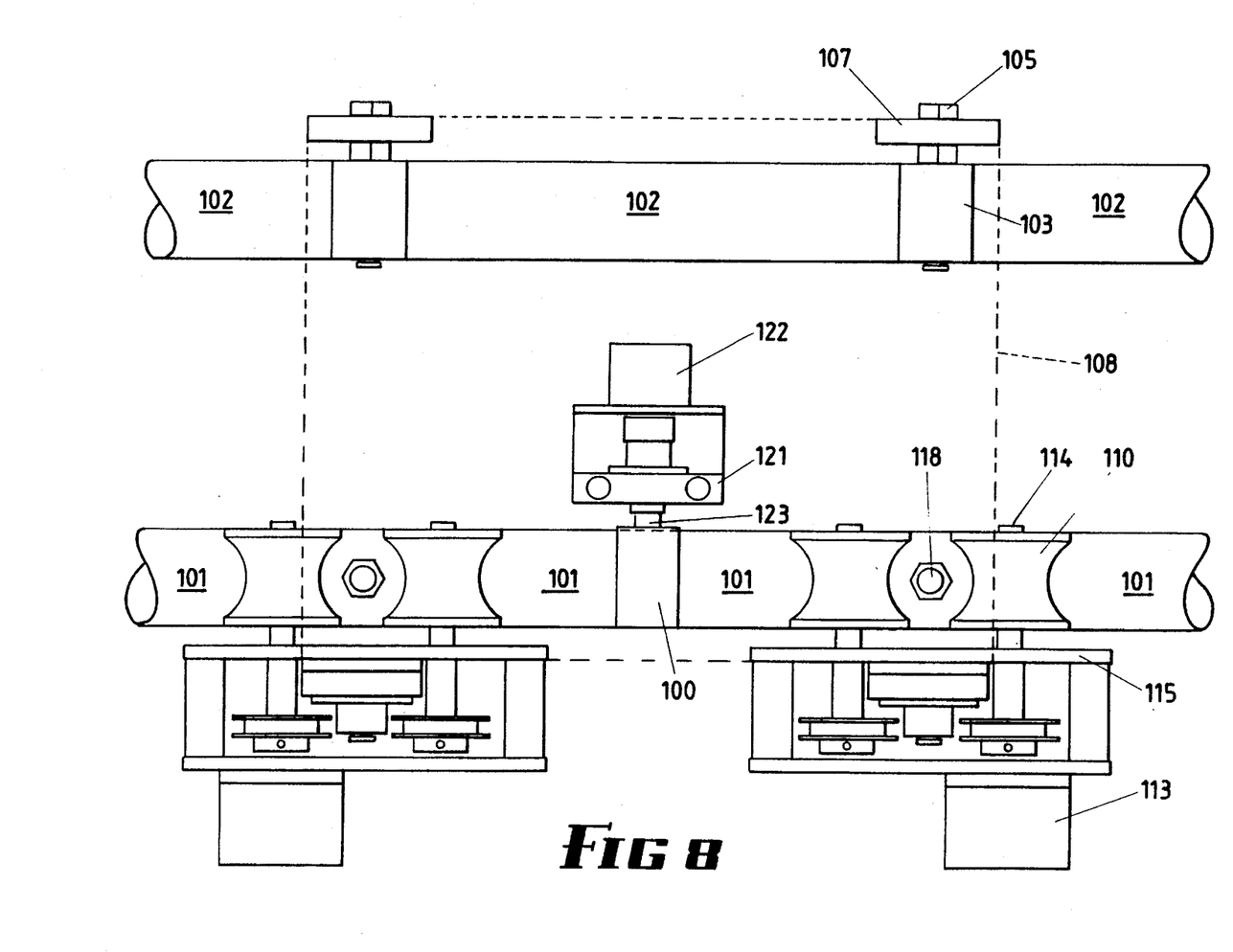
FIG. 8 depicts a schematic of the dolly drive and stabilisation rollers in plan view as seen without a motor and drive pulley in place.
Figure 9:
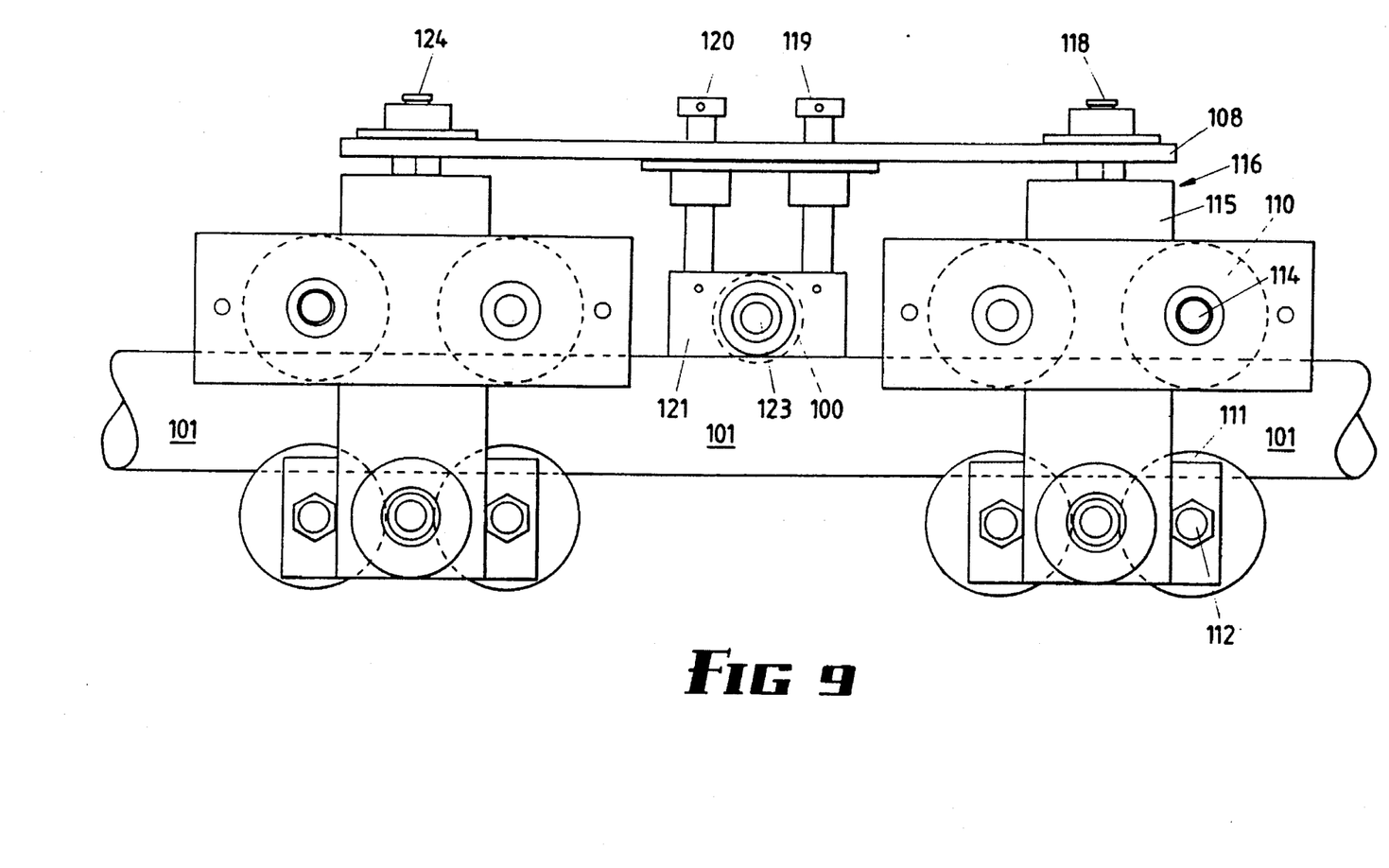
FIG. 9 depicts a schematic of the dolly drive and stabilisation rollers in elevation view.

The dolly drive system which is related to the track motion curve is such that the physical track elements may have a profile which takes the dolly around curves or along straight paths which themselves may be located on walls, on the ground and in other orientations and locations as required. The drive rollers 77 are closely coupled to the track 72 and dolly track position sensing is achieved by running a light rubber wheel located on the shaft of an independent shaft encoder device 120 as shown in FIGS. 7, 8 and 9. This shaft encoded wheel is less prone to drive slip, which may well occur to the drive wheels of the dolly, however, if slip does occur, the encoder does not increment and motor drive signals do not cease until the required position is achieved as determined not only by the shaft encoder. Positioning accuracy has been found to exceed +/− one quarter of a millimeter over traverses of a 3 meter track section.

FIGS. 7, 8 and 9 depict schematic depictions of the dolly drive apparatus. Like numerals in FIGS. 7, 8 and 9 depict like elements of the dolly drive apparatus. Circular track sections 101 and 102 are shown end on in FIG. 7 and stabilisation rollers 103–104 are depicted as abutting the track section 102 on its upper and lower surfaces. These rollers are located by spindles 105 and 106 respectively which are bolted on to depending plate 107. The camera platform 108 provides a fixing point for the depending plate 107 at its edge periphery portion 109. Camera platform 108 extends above and beyond the side edges of the two track sections 101 and 102.

Main drive rollers 110 and 111 are located respectively above and below track section 101. The cross-section profile of the rollers 110 and 111 are shown as having a semicircular shape, which largely conforms to the external shape of the track section 101 and greater conformance to that shape is ensured by the nature of the compliance of the soft rubber from which the main drive rollers are comprised. Although not directly apparent from the drawings the spindle 112 of the lower main drive roller is located eccentrically to allow adjustment of the pressure applied by the roller to the track section and thereby ensure positive application of rotational energy to the track section.

A drive motor 113 is connected to a drive spindle 114 which is fixed and rotates roller 110. Dependent member 115 is attached to a cantilever member 116 at 117, and it is upon the dependent member 115 that the drive shaft 114 and spindle 112 are secured. Spindle 118 projects from above the camera platform 108 to and through cantilever member 116 and connects to secure the assembly comprising of cantilever member 116, dependent member 115 and its associated spindles and drive rollers, such that rotational movement around the spindle 118 to a slight degree is possible. This arrangement allows the rollers to traverse track shapes which would, when looking at the end elevation of FIG. 7 diverge left and right thereof. Upward and downward directions of the track section would not require movement of a rotational kind as the camera platform will be maintained parallel to the track sections during that motion and the camera will be accordingly controlled to account for its changing orientation.

Rod 119 shown in side elevation in FIG. 7 co-operates with rod 120 as shown in FIG. 23 to support plate member 121 which thereupon is supported a shaft encoder device 122 visible in FIGS. 7 and 8 which is attached by spindle 123 to the shaft encoder roller 100. This arrangement shown in FIG. 23 comprising rods 119 and 120, plate 121 maintains the shaft encoder roller 100 upon the track section 101 as the dolly apparatus traverses the bends, hills and gullies of the track section. Rods 119 and 120 are adjustable length wise such that they are able to maintain a firm pressure between the shaft encoder roller 100 and the track section 101. As can be seen from in FIG. 23 two pairs of main drive rollers are used below each of the spindles 118 and 124.

Figure 10:
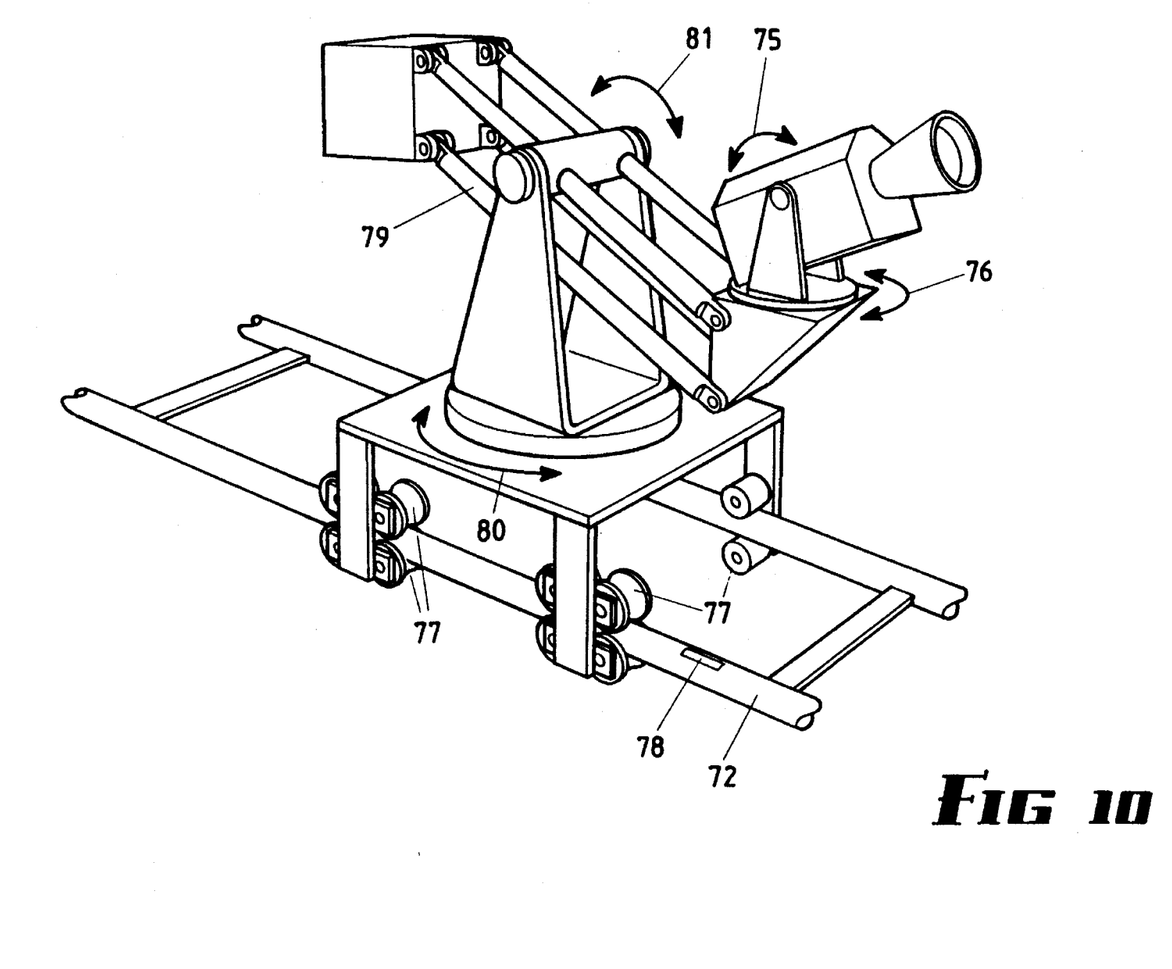
FIG. 10 depicts a jib arm mounted on a dolly drive platform.

FIG. 10 shows a jib arm 79 which provides a larger sweep of the pan 76 and tilt 75 functions of the camera and by incorporating separately controllable jib swing 80 and jib up/down 81 motors for the jib arm at the position of the dolly 70, combinations of pan and tilt motion can be produced. Shaft encoders are attached to the appropriate axes of the jib arm to provide feedback for the accurate control of these motor axis movements.

Figure 11:
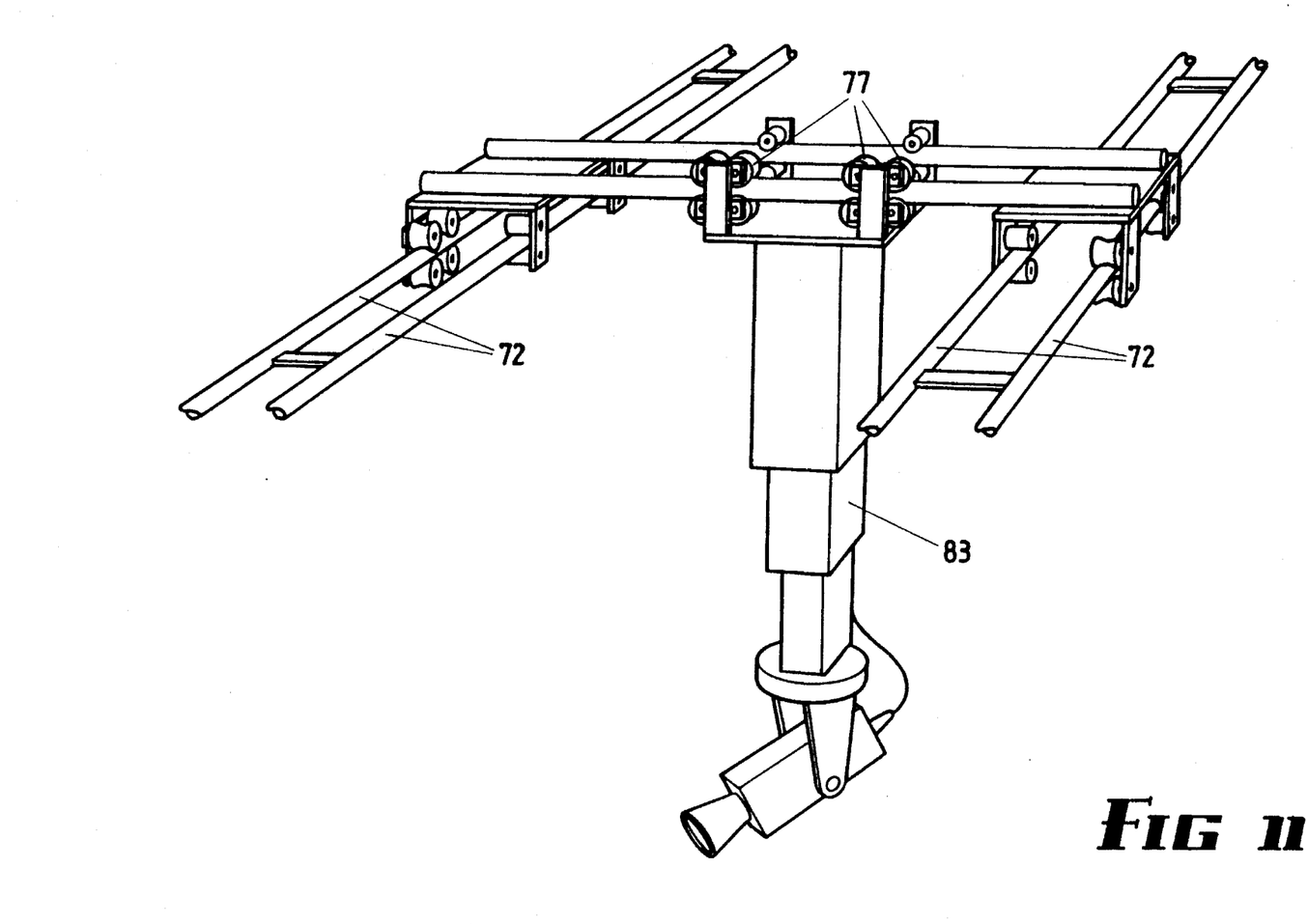
FIG. 11 depicts a telescopic arm suspended from a gantry.

FIG. 11 shows a telescopic arm 83 or height adjustment means incorporated so that either in the flat or upside down suspended configuration the height of the camera can be adjusted. This is one version of a gantry device.

Track sections 72 are preformed modules which fit together to form the desired shape suitable for guiding the motion of the camera.

Each track section 72 is identified by a unique bar code which identifies its physical characteristics such as curvature, length and overall shape.

This enables the dolly device and its associated driver module to either know or alternatively learn the path and its consequent characteristics. The remote control console may accept this information and allow instructions to the camera dolly to be referred to by the track it traverses or 3-dimensional pictorial representation can be provided of the track so that camera and dolly motions are created using the 3-dimensional model provided.

Track sections are preferably constructed of light zinc passivated steel tube and fitted with heating elements to maintain their temperature and prevent condensation and ice accumulation. This measure assists the maintenance of length and shape in the track.

Standard tripods and scaffolding benches 84 as depicted in FIG. 6 are used to support the track sections and where appropriate the track may be secured to the ground, walls, ceilings and other stable locations.

The prior art fails to provide any individual elements of equal versatility or any combination of elements which has the characteristics of the invention described.

A motion control apparatus of the invention provides portability, repeatability and accuracy, hitherto impossible to achieve, as well as providing film and video making techniques limited largely by the operator's imagination.

The claims defining the invention are as follows:

1. A motion control apparatus for controlling a motor means which drives at least one degree of motion of an object over a predetermined period of time, said apparatus comprising,
   - a motion description means for accepting at least two position and velocity set points to be traversed by said object,
   - a motion curve calculation means which receives said set points which calculates the coefficients of a cubic parametric motion curve representative of said position and velocity set points,
   - a curve generation means adapted to accept said coefficients to generate digital values representative of said motion curve, and
   - an axis model means which accepts said digital values applies a correction factor to said digital values, the correction factor being representative of the physical arrangement of the motor means which drives a degree of motion of said object and converts said corrected digital values into signals to drive said motor means to control the position and orientation of said object.

2. A motion control apparatus according to claim 1 wherein said motion description means further comprises,
   - a operator input means usable by an operator for defining said at least the position and velocity set points and said predetermined period of time and for outputting said set points in a predetermined format to said motion curve calculation means which then calculates said motion curve thereby making the operation of defining set points interactive with the motion being controlled.

3. A motion control apparatus according to claim 2 wherein said operator input means comprises
   - a graphical user interface which accepts from said curve generation means said digital values representative of said motion curve and depicts
   - a graphical representation of said motion curve over said predetermined period of the motion of said object and which further comprises means to indicate which of said degree of motion is associated with said set points.

4. A motion control apparatus according to claim 3 wherein said set points may be modified by changing the position and velocity value of said set points on the graphical representation.

5. A motion control apparatus according to claim 1 wherein said motion control apparatus further comprises
   - a signal processing means which receives said digital values generated by said curve generation means and at least one other input signal received in the form of digital values and which combines said digital values in a predetermined manner for input to said axis model means to provide one or more variables to the motion of said at least one degree of motion of said object.

6. A motion control apparatus according to claim 5 wherein said signal processing means comprises
   - summing means for summing the digital values of each of said at least one signal and said digital values generated by said curve generation means received.

7. A motion control apparatus according to claim 5 wherein said signal processing means comprises
   - multiplying means for multiplying the digital values of each of said at least one signal and said digital values generated by said curve generation means received.

8. A motion control apparatus according to claim 5 wherein said signal processing means comprises
   - filtering means for filtering the digital values of each of said at least one signal and said digital values generated by said curve generation means received.

9. A motion control apparatus according to claim 5 wherein said graphical user interface is used by said operator to determine said other input signal or signals whereby said other signals are provided to said signal processing means in the form of digital values.

10. A motion control apparatus according to claim 1 wherein said motion curve calculation means, motion curve generation means and axis model means comprises a transputer device.

11. A motion control apparatus according to claim 10 wherein said motion description device accepts position and velocity set points in the format (TOKEN, ARGUMENT) where said TOKEN is a set point part at said format and said ARGUMENT comprises the digital values representative of a position and velocity part of at least one degree of motion of an object.

* * * * *